United States Patent [19]
Pinckney et al.

[11] Patent Number: 6,119,138
[45] Date of Patent: Sep. 12, 2000

[54] WIRELESS COMPUTER COMMUNICATION APPARATUS, AND RELATED METHOD

[75] Inventors: Christopher T. Pinckney, Irvine; Bret R. Howe, Mira Loma; Robert E. DeCaro, San Juan Capistrano, all of Calif.

[73] Assignee: Novalog, Inc., Costa Mesa, Calif.

[21] Appl. No.: 08/807,283

[22] Filed: Feb. 27, 1997

[51] Int. Cl.[7] .................................................. G06F 1/16
[52] U.S. Cl. .......................................... 708/109; 361/686
[58] Field of Search ..................................... 361/683, 724, 361/730, 752, 686; 358/479; 364/705.01, 708.1, 709.11, 709.1, 709.2; 708/109, 140, 141

[56] References Cited

U.S. PATENT DOCUMENTS

| | | | |
|---|---|---|---|
| 4,975,926 | 12/1990 | Knapp ........................................... 375/1 |
| 4,977,618 | 12/1990 | Allen .......................................... 455/607 |
| 5,175,672 | 12/1992 | Conner et al. ............................. 361/393 |
| 5,247,285 | 9/1993 | Yokota et al. ............................. 345/169 |
| 5,343,319 | 8/1994 | Moore ....................................... 359/152 |
| 5,440,449 | 8/1995 | Scheer ....................................... 361/686 |
| 5,519,527 | 5/1996 | Panton ....................................... 359/159 |
| 5,544,011 | 8/1996 | Blaney et al. ............................. 361/683 |
| 5,548,654 | 8/1996 | Fast ............................................. 381/77 |
| 5,550,649 | 8/1996 | Wong et al. ............................... 358/479 |
| 5,587,876 | 12/1996 | O'Brien et al. ........................... 361/682 |
| 5,608,606 | 3/1997 | Blaney ...................................... 361/686 |
| 5,781,407 | 7/1998 | Brauel ....................................... 361/683 |

OTHER PUBLICATIONS

NEC Commercial Systems, Brochure entitled: "PowerMate Systems", c Feb. 1996, Order No. D–PMFAM2–S, 819–003517–000 Rev. 00.

*Primary Examiner*—David H. Malzahn
*Attorney, Agent, or Firm*—Myers, Dawes & Andras LLP

[57] ABSTRACT

An improved apparatus and method are provided for wireless communication with computers. The communication apparatus is integral with a removable by cover of a computer case and operatively connected to memory means associated with the case. By mounting or affixing the wireless communication device to a bay or slot cover in the computer case, conventional existing computers can be readily retrofitted to include integral and upgradable wireless communication. In certain embodiments, a jack or other connection is provided in the bay or slot cover, and a removable wireless communication member is selectively connected to the jack. Cable means preferably connect a motherboard within the computer housing to the wireless communication device. The wireless communication device or connection may be combined on a single bay cover with a conventional device such as a diskette drive, tape drive, or the like.

18 Claims, 4 Drawing Sheets

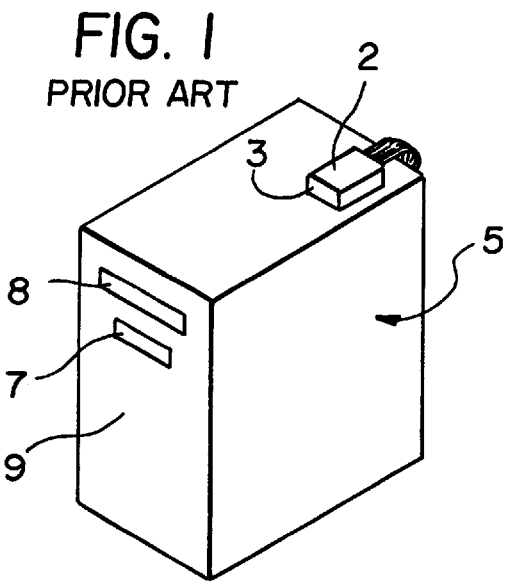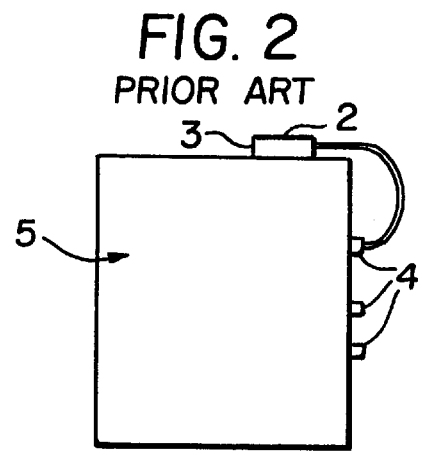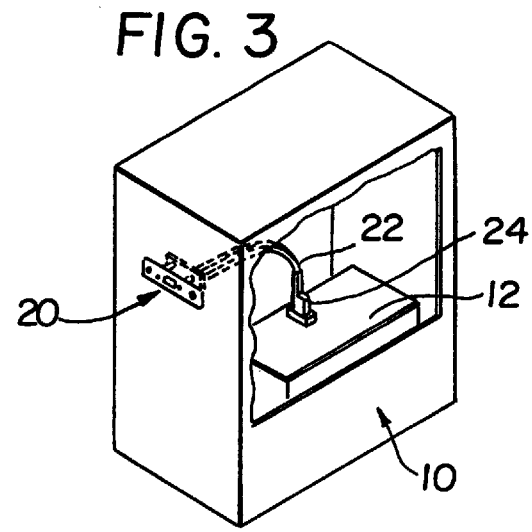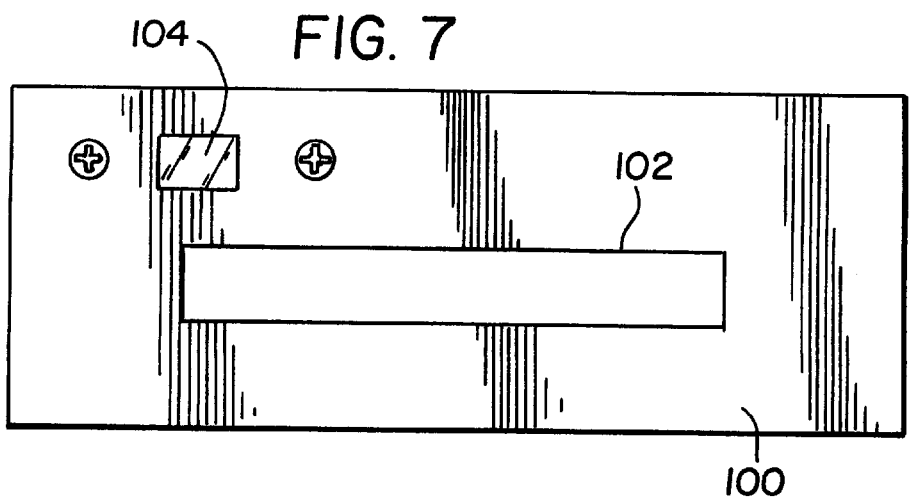

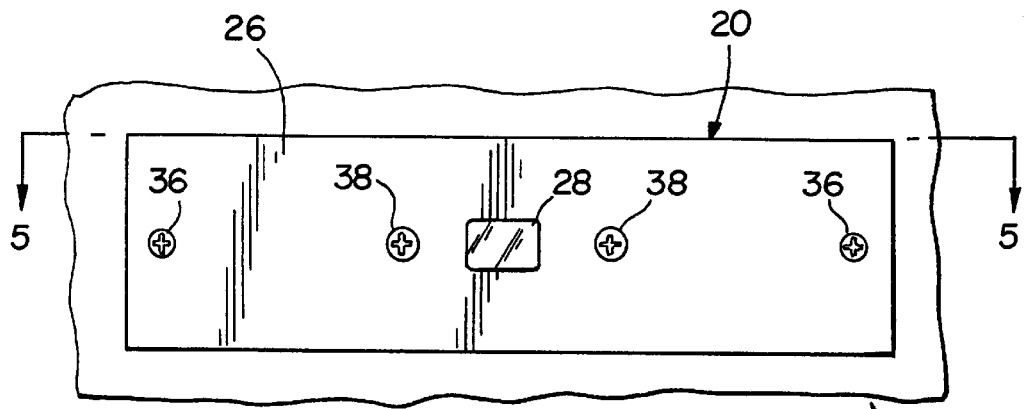
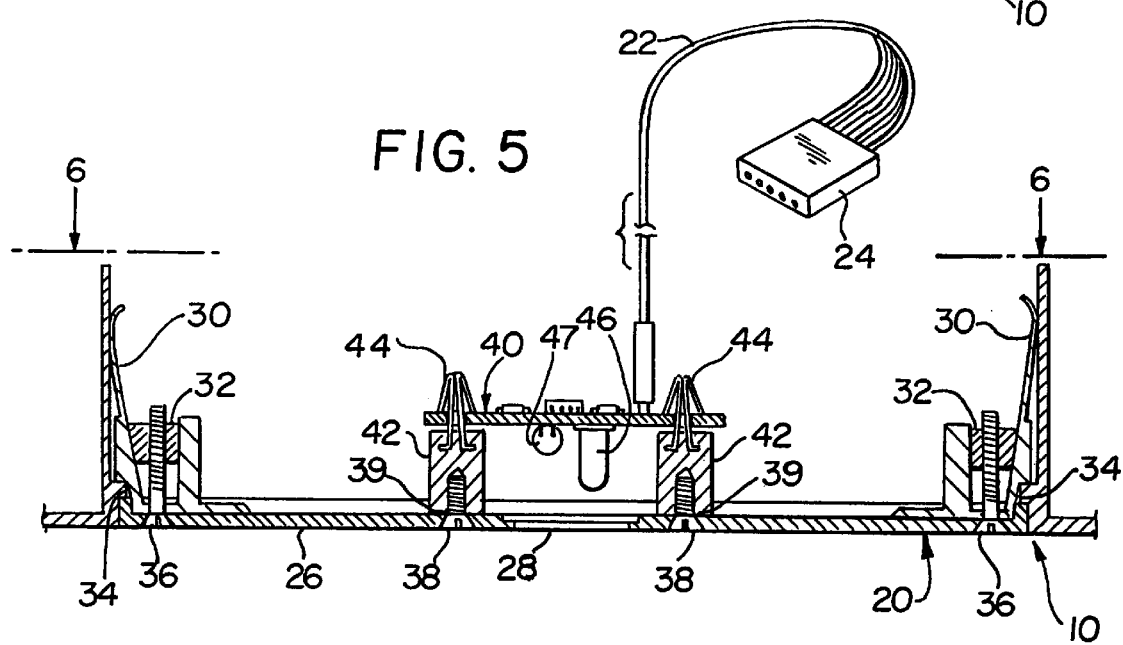
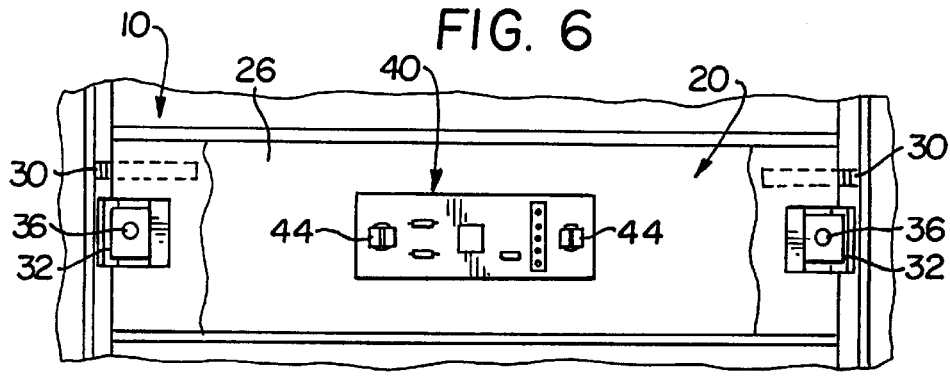

WIRELESS COMPUTER COMMUNICATION APPARATUS, AND RELATED METHOD

This invention relates to an improved apparatus and method for wireless computer communication and, more particularly, to apparatus integrating wireless communication with a readily replaceable portion of a computer case, and a method of installation and use of same.

BACKGROUND OF THE INVENTION

Infrared (IR) or similar wireless communication between and among computers and similar devices is well known. Conventional prior art approaches include a personal computer case, such as a tower case illustrated in FIGS. 1 and 2, with an external add-on IR device (or an external adapter or dongle) connected to one of the ports on the back of the computer. Separate external devices (not shown), such as other computers, keyboards, instruments or the like, can communicate with the personal computer via the external add-on IR device, through the dongle.

While such prior art arrangements provide certain benefits over their hard-wired predecessors (e.g., predecessor systems in which keyboards and others computers were physically cabled to each other), the arrangements still have numerous shortcomings. Among other things, the desired IR communication with the device may be difficult to establish, especially with an acceptable degree of reliability. For example, typical IR communication of this sort requires a clear "line of sight" between the communicating devices. Conventional IR devices on the personal computer may not be readily "seen" by the other communicating IR device because they may be near the rear of the computer, turned away from the front of the computer (because of being bumped or the like), or otherwise not reliably positioned for the desired communication. In other words, the "line of sight" necessary to establish IR communication between the personal computer's IR device and some other IR device may not be readily and repeatably established, because the computer's IR device may be moved, other paraphernalia may be placed between the computer's IR device and the other IR device, etc.

Such conventional IR communication arrangements also tie up a port on the back of the computer (which may be in high demand, especially in our age of an increasing variety and number of peripheral devices vying for a limited number of ports). There is also some possibility that the external dongle connection to the back of the computer might be inadvertently dislodged, disrupting or preventing the desired IR communication. The dongle also adds to the tangled mess of wires commonly found on the rear of personal computers.

Other prior art devices (not shown) incorporate an IR device fixed to the entire unitary front panel of a tower case. Examples of this type of device include the NEC PowerMate Pro150 or NEC Model No. 9542, among others. While this addresses some of the problems set forth above (the IR device is "fixed" with respect to the case), it does not provide any benefits to the millions and millions of existing tower cases; instead, it effectively requires a user to purchase an entire new computer and housing if the user desires some solution to some of the problems identified above.

OBJECTS AND ADVANTAGES OF THE INVENTION

It is, therefore, an object of the invention to provide an improved apparatus and method for communication between a computer and external devices such as keyboards, other computers, instruments, or the like.

The apparatus is preferably characterized by a computer case or housing for a computer means, and at least one wireless communication member affixed to a removable portion of the case. The wireless communication member is positioned on the case to facilitate desired communication between an external device and the computer means. The wireless communication member may be conveniently affixed to a bay or slot cover on the front of the case or housing, or may be located on some other removable portion of the case.

Another object of the invention is to provide an apparatus of the aforementioned character, including cable means connecting the wireless communication member to a motherboard of the computer means. The cable means is capable of communicating the wireless signals between the wireless communication member and the motherboard.

As described hereinbelow, the case preferably defines a first space inside the case and a second space outside the case, and the removable portion of the case further includes a first opening therein. The wireless communication member is affixed in the first space inside the case adjacent the first opening, to facilitate the desired communication with the external device through the first opening.

Yet another object of the invention is the provision of apparatus of the aforementioned character, in which the removable portion of the case includes integrally formed mounting members to which the wireless communication member is affixed.

Still another object of the invention is the provision of apparatus of the aforementioned character, in which the removable portion of the case includes at least one secondary opening therein adjacent the first opening, and cooperating mounting members associated with the wireless communication member utilize the secondary opening to affix the wireless communication member to the removable portion of the case.

Another object of the invention is the provision of apparatus of the aforementioned character in which the wireless communication member includes at least one wireless unidirectional or bi-directional communication device (or a combination of such devices) adjacent the first opening in the removable portion of the housing or case.

A further object of the invention is the provision of apparatus for wireless communication, including housing means defining an inside space and an outside space, memory means mounted in the inside space, and wireless communication means mounted in the inside space and affixed to a removable portion of the housing means. The wireless communication means preferably provides wireless communication between an external device and the memory means. As indicated above, although the wireless communication means is preferably affixed to a bay cover in the housing, it may be affixed to a removable portion of the housing other than the bay cover. As further indicated above, cable means may be provided to operably connect the wireless communication means to a motherboard of the memory means, the cable means being capable of communicating signals or data between the wireless communication means and the motherboard.

An additional object of the invention is the provision of a computer, including memory means within a housing for the computer and an wireless communication device mounted within the housing and affixed to a removable portion of the housing, the wireless communication device being capable of processing signals between an external device and the memory means.

It is also an object of the invention to provide an improved method for wireless communication with a computer, including the steps of affixing a wireless communication member to a readily removable and interchangeable piece of a housing case for the computer, providing a cable member between the wireless communication member and a computer memory within the housing case, and transmitting wireless signals or data between an external device and the computer memory via the wireless communication member and the cable member. The affixation step of the wireless communication member to the removable and interchangeable piece of the housing case preferably includes affixing the wireless communication means to a bay cover of the housing case.

Another object of the invention is to provide a method of retrofitting conventional computer cases for wireless communication, including providing a wireless communication member affixed to a first bay cover, removing a correspondingly sized and shaped second bay cover from the computer case, replacing the second bay cover with the first bay cover, and attaching a cable between the wireless communication member and computer means within the computer case. The cable is preferably capable of transmitting wireless signals or data between the computer means and the wireless communication member.

Other objects and advantages of the invention will be apparent from the following specification and the drawings.

BRIEF DESCRIPTION OF THE DRAWINGS

FIG. 1 is an orthogonal view of a conventional prior art infrared communication assembly for a personal computer;

FIG. 2 is a side view of the prior art assembly of FIG. 1;

FIG. 3 is a partially cutaway view, showing a preferred embodiment of the apparatus of the invention;

FIG. 4 is a partial front view, showing a preferred bay cover usable in the apparatus of FIG. 3;

FIG. 5 is a partially sectional top view of the cover of FIG. 4, taken on the broken line 5—5;

FIG. 6 is a back view of the cover of FIG. 4, taken on the broken line 6—6 of FIG. 5;

FIG. 7 illustrates one of the many alternative embodiments of the invention, in which a bay cover includes both a wireless communication device and a conventional computer diskette drive opening;

DESCRIPTION OF THE PREFERRED EMBODIMENT

Figure 8:
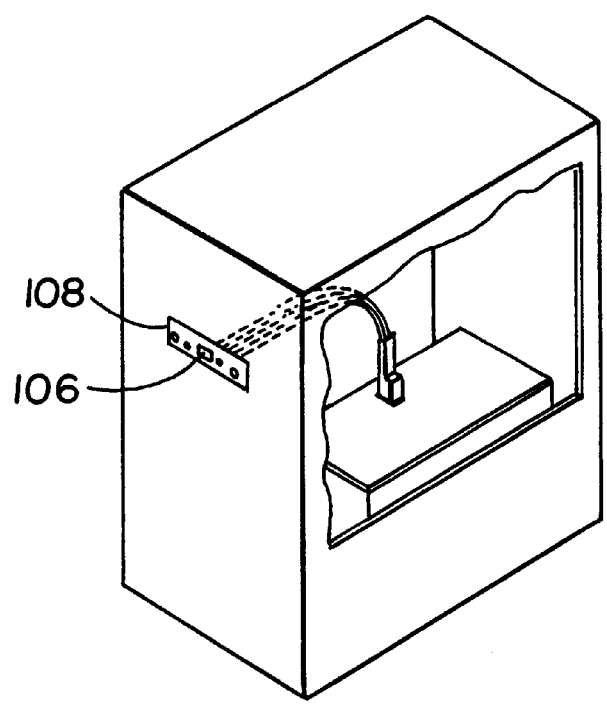
FIG. 8 is similar to FIG. 3, but illustrates another of the many alternative embodiments of the invention, in which a connecting device (for removable connection of wireless communication devices or dongles) is mounted on a bay cover and is cabled to a motherboard.

Among other things, the drawings illustrate a preferred embodiment of the invention, including an improved computer communication apparatus.

By way of comparison, a conventional prior art computer case 5 is illustrated in FIGS. 1 and 2. The case 5 is shown as a "tower" or upright case, but persons of ordinary skill in the art will understand that it could be any of a variety of configurations. Typically, the working components of the computer are housed within the case, and tape drives, diskette drives or the like 7 and 8 are positioned on the front 9 of the case 5.

A dongle 2 connects an IR communication device 3 to one of the ports 4 on the rear of the case or housing 5. As indicated above, the IR communication device 3 can become misaligned or can otherwise be difficult to establish the necessary line of sight for communication with another IR device.

The present invention eliminates the clutter and other potential communication problems associated with conventional IR communication. The present invention also facilitates and makes easier the replacement and/or installation of that improved wireless communication as a "built-in" element of the housing. Moreover, certain embodiments enable current and future upgrading and retrofitting of many (if not most) existing computer housings in that regard, without the need to modify the "non-replaced" portions of the housing (such as by cutting, gluing, or the like).

Persons of ordinary skill in the art will understand that the various components discussed herein may be of any suitable materials and construction, including conventional materials and construction. Among other things, the cables and wiring, motherboard, computer case and wireless communication devices may be of conventional materials, size, and general configuration and functionality.

As illustrated in a preferred embodiment of FIGS. 3–6, a computer case or housing 10 defines a space inside the case and a space outside the case. The cutaway view of FIG. 3 illustrates computer memory or computer means 12 positioned within the space inside the case. Persons of ordinary skill in the art will understand that this computer memory or computer means 12 can include a motherboard, RAM, computer chips and/or other components useful in connection with operation of a computer.

The preferred embodiment of the invention includes an IR or other wireless communication member or device 20 operatively connected to the computer memory or computer means 12 by a cable or wiring harness 22. A connector 24, FIGS. 3 and 5, is preferably provided to permit ready connection of the wiring 22 to the motherboard.

Although much of the preferred embodiment is described in connection with IR devices and IR wireless communication, that specific type of wireless communication is selected for demonstrative purposes only, and aspects of the invention are similarly useful in connection with other wireless communication and devices. Among others, and not by way of limitation, such devices include electromechanical, electro-optical, radio frequency, audio signaling, other frequencies and the like.

The preferred wireless communication member or device 20 is preferably affixed or mounted on a readily removable portion of the case, in the space inside the case or housing 10. As shown in FIG. 3, the preferred location of the removable portion is at the front of the case 10, in an expansion bay area similar to conventional locations for tape drives and diskette drives. Persons of ordinary skill in the art will understand that, in alternative embodiments, the wireless device could be affixed to a removable portion of the case so that some or all of it was on the outside of the case with the cable member still connecting the wireless device and the computer means inside the case.

In the preferred embodiment, the wireless communication member or device 20 is mounted on a bay panel or slot cover 26, FIGS. 4–6. This arrangement permits ready retrofitting of existing computers and cases, in that the bay or slot covers on the front of such computers are typically removable and could be quickly replaced with bay or slot covers 26 of the invention without damaging or modifying any other portion of the computer case.

The preferred cover 26 includes an opening 28 therein, consisting of an optically transparent window or viewport. In alternative embodiments, the opening 28 or its equivalent need only be transparent to the selected wireless signal transmission (RF, audio, etc.). Although FIGS. 3–6 show the window 28 as centrally positioned on the cover 26, those of ordinary skill in the art will understand that it can be readily located at any suitable position on the cover 26. One of the many alternative embodiments of the present invention which illustrates this wide range of positioning is shown in FIG. 7, in which a bay cover panel 100 includes a conventional diskette or tape drive opening 102, and also includes an IR opening or window 104 adjacent thereto.

As indicated elsewhere herein, the bay cover 26 is preferably removably mounted in the housing or case 10. Preferably, grounding is provided by elements such as spring-acting fingers 30 which contact the metal chassis on which the housing is assembled (among other things, the preferred grounding complies with FCC requirements). The removability of portion 26 is preferably provided by interengaging detent members 32 and 34 or the like. In the illustrated embodiment, the screws 36 are loose when the bay cover 26 is inserted into the housing, and screws 36 are then tightened to hold the cover 26 in relation to the rest of the case. This arrangement allows the preferred embodiment to be assembled on a beneficially wide, almost universal, range of cases or housings.

Although the drawings illustrate the use of screws 36 and 38 to attach the detents 32 and other elements to the bay cover 26, persons of ordinary skill in the art will understand that the bay cover 26 and the various elements thereon may be fabricated in any suitable manner, including gluing or heatstaking the components to the bay cover, integrally molding the elements with the flat front portion of the bay cover, etc. For example, in an embodiment in which the detents 32 were integrally molded with the front portion, the front view of FIG. 4 would not show any screw heads. Such an embodiment might, for example, rely on the spring action of the integrally molded detents to "snap" into engagement with mating detents on the communication member or device 20, as discussed below.

The preferred wireless communication member or device 20 includes a transceiver circuit board 40 operably mounted or affixed to the bay cover 26. As indicated above, the drawings illustrate the use of screws 38 through holes 39 in the cover 26. The screws 38 affix to the cover 26 one or more mounting posts 42 having retaining clips 44 thereon. The circuit board 40 is snapped onto the clips 44 and retained thereon by their spring-like expansion.

As also indicated above, persons of ordinary skill in the art will understand that a wide variety of means can be effectively utilized to affix the circuit board 40 in operable position relative to the opening 28 (such as gluing, heatstaking, or similar expedient). Persons of ordinary skill in the art will also understand that current industry standards for IR communication will affect the selection, sizing and positioning of various components in the IR communication device 20. Among other things, the "cone" of IR communication (that is, the angle between which IR signals are projected through the window 28 to and from the IR device 20) must fall within specific size limitations. Factors influencing the size and shape of that "cone" include the distance between the IR circuit board 40 and the cover plate 26, the size and shape of the opening or window 28, and the distance between the window 28 and the light-emitting device 46 and the photodiode 47 or other transmitting and/or receiving devices on the circuit board 40.

Persons of ordinary skill in the art will understand that, for embodiments utilizing IR as the wireless transmission means 20, data or similar signals are transmitted in the form of light. For typical IR reception, one or more photodiodes 47 on the IR transceiver 40 receive the light signals and produce corresponding analog electronic signals. Those analog signals are typically forwarded to a receiver, which converts them to digital signals usable by a serial controller. The controller typically converts the signals into parallel data, which can be readily used by other portions of the computer means 12. For transmission, the signals travel a reverse route to that just described, with the exception that a transmitter is used instead of a receiver, and a light-emitting device is used to emit signals in the form of light (instead of a photodiode receiving light signals).

Figure 9:
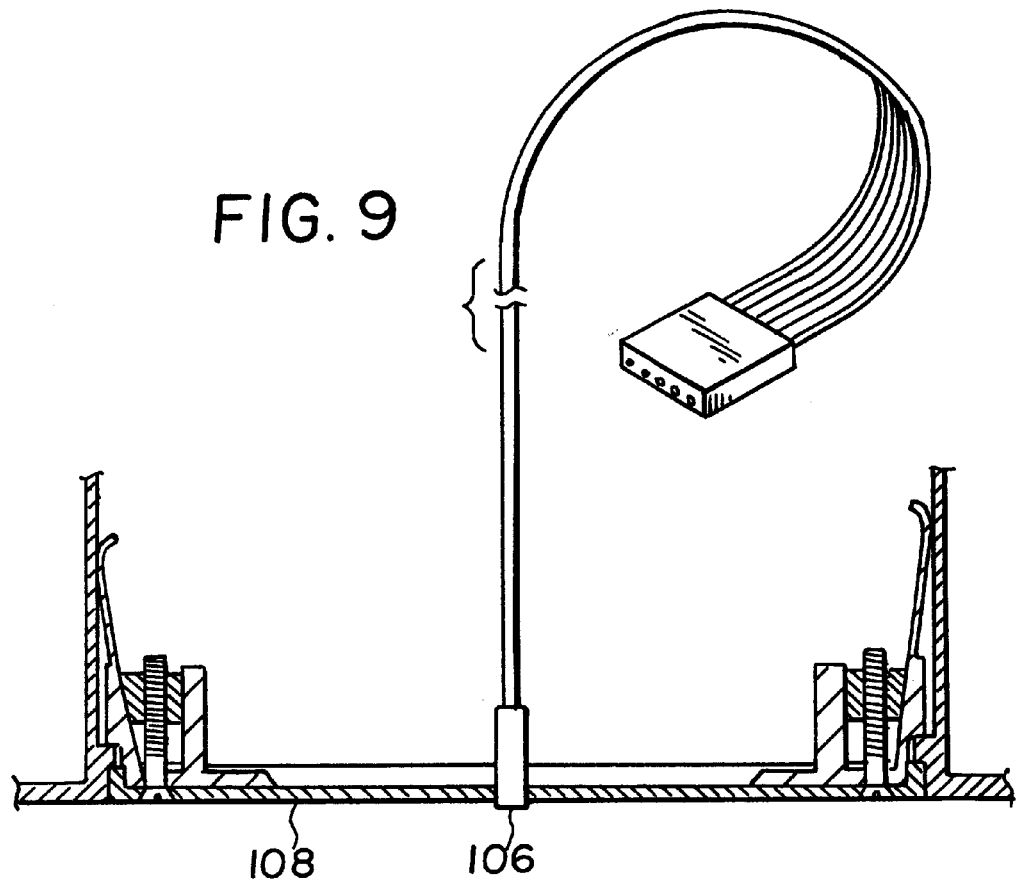
FIG. 9 is a partially sectional top view of the embodiment of FIG. 8, similar to the view of FIG. 5.

Some of the many alternative embodiments of the invention are illustrated in FIGS. 8 and 9. In such an embodiment, a connecting member 106 (such as an audio jack, telephone jack, or similar functional connector) is affixed to a removable portion 108, by integral molding the connecting member into the plastic, or by gluing, heat-staking, or similarly attaching elements 106 and 108 to each other. In such embodiments, the wireless communication member thus includes at least one connection device. Persons of ordinary skill in the art will understand that such removably front mounted jacks permit the selective connection and positioning of a removable wireless transceiver or other device to the exterior of the computer housing or case, all without tying up any of the scarce ports on the back of the computer. As with the preferred embodiment, this alternative permits the aforementioned ready modification to millions of existing computer cases to improve and facilitate various aspects of communication between the world outside the computer case and the world inside it.

Figure 10:
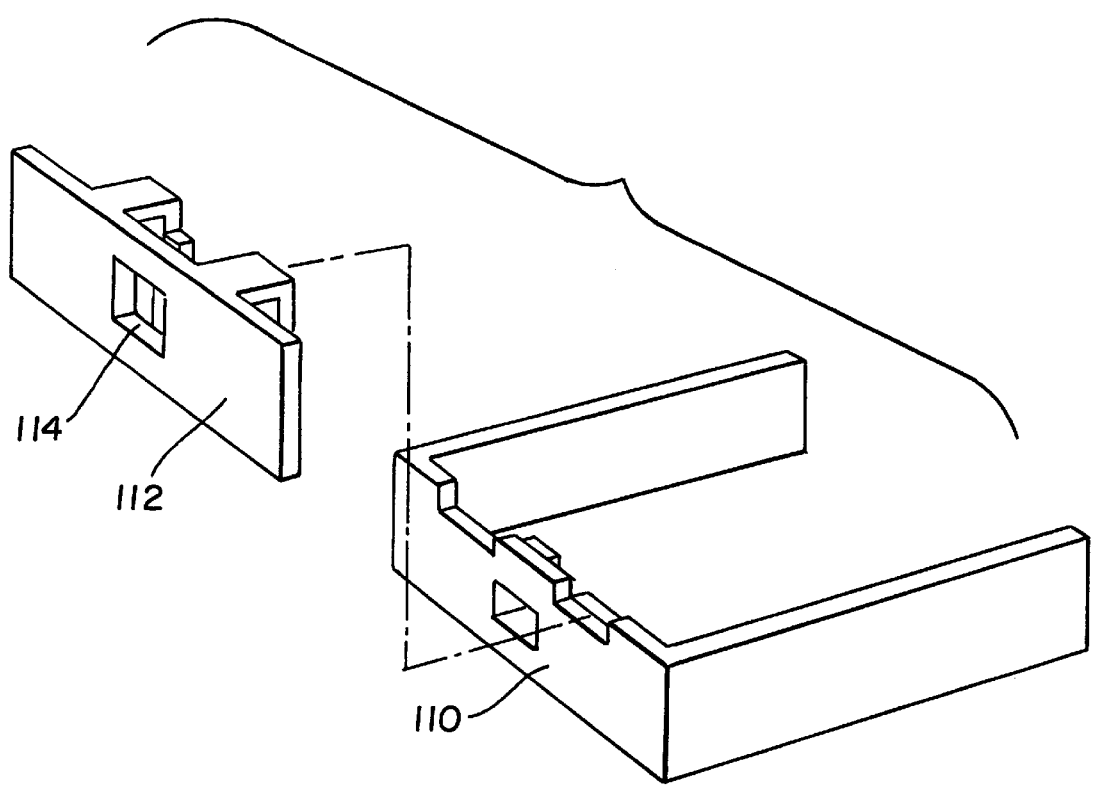
FIG 10 illustrates yet another of the many alternative embodiments of the invention, including a frame member engagable with conventional rails and a cover plate therefor.

Another of the many alternative embodiments of the invention is illustrated in FIG. 10. A frame member 110 is configured to be engagable with conventional mounting rails in a computer case (not shown), and a cover plate 112 operatively attaches to the frame member 110. A wireless communication device (not shown) is preferably mounted adjacent a window 114, similarly to the embodiments described above, but the window 114 is not necessary for certain embodiments of the invention (as also discussed above). Persons of ordinary skill in the art will understand that, by fabricating the frame member from the metal or some other conductive material and by appropriate screws or other connecting conductive pathways, desirable grounding of the apparatus can be achieved. The cover plate 112 may be fabricated from any suitable material, such as injection-molded plastic or the like.

The invention also includes improved methods for infrared or other wireless communication with a computer. A preferred method includes the steps of affixing a wireless communication member to a removable portion of a housing case for said computer, providing a cable member between the wireless communication member and a computer memory within the housing case, affixing the removable portion to the rest of the computer housing, and transmitting communication between an external device and the computer memory via the communication member and the cable member. The preferred affixation step of the communication member to the removable portion of the housing case includes affixation of the communication means to a bay cover of the housing case.

Another method of the invention includes retrofitting a conventional computer case for infrared or other wireless communication, including the steps of providing a wireless communication member affixed to a first bay cover, removing a correspondingly sized and shaped second bay cover from the computer case, replacing the second bay cover with the first bay cover, and attaching a cable between the wireless communication member and computer means within the computer case, which cable is capable of transmitting signals between the computer means and the communication member. As indicated above, such retrofits provide the benefits of the invention to existing computer owners, with a minimum cost and minimum change to their existing computer, and without mutilating their existing computer cases.

Persons of ordinary skill in the art will understand that a wide variety of combinations of the structures and methods described herein can be used effectively in various applications and embodiments of the invention.

The preferred embodiment of the invention thus simplifies and makes more certain IR and other wireless communication with computers, especially existing desktop computers. The invention reduces the likelihood of failed or inaccurate communication, and reduces the physical clutter on the outside of a computer case, while freeing one of the ports on the computer that would otherwise be occupied by a dongle.

While the preferred embodiment and methods of the invention have been described with some specificity, the description and drawings set forth herein are not intended to be delimiting, and persons of ordinary skill in the art will understand that various modifications may be made to the embodiments and methods discussed herein without departing from the scope of the invention, and all such changes and modifications are intended to be encompassed within the appended claims.

What is claimed is:

1. An apparatus for wireless communication with computers, said apparatus comprising:
    a computer case defining at least one exposed surface, said surface having a removable bay cover smaller than said surface, said removable bay cover being removable from said case independently of the rest of said surface;
    a computer device affixed to said case; and
    at least one wireless communication member affixed to said removable bay cover, said wireless communication member being configured to communicate wireless signals between an external device and said computer device.

2. The apparatus of claim 1 further comprising a cable connecting said wireless communication member to a motherboard of said computer device, said cable being capable of communicating said wireless signals between said wireless communication member and said motherboard.

3. The apparatus of claim 1 wherein said case defines a first space inside said case and a second space outside said case, said removable bay cover comprising a first opening, said wireless communication member being disposed in said first space and adjacent to said first opening to facilitate the wireless communication with the external device through said first opening.

4. The apparatus of claim 3 wherein said removable bay cover comprises mounting members.

5. The apparatus of claim 3 wherein said removable bay cover comprises a frame with the first opening and a cover plate with at least one secondary opening adjacent to said first opening.

6. The apparatus of claim 5 wherein said wireless communication member comprises a wireless transceiver.

7. The apparatus of claim 1 wherein said wireless communication member comprises at least one connection device affixed to said removable bay cover, said connection device being accessible from said exposed surface for selective connection to a removable wireless transceiver.

8. An apparatus for wireless communication, the apparatus comprising:
    a housing defining an inside space and an outside space, the housing having at least one bay cover and a remaining portion, said bay cover being removable independently of the remaining portion;
    a memory device mounted in said inside space; and
    a wireless communication device affixed to said bay cover.

9. The apparatus of claim 8 further comprising a cable, wherein said memory device comprises a motherboard, said cable connecting said wireless communication device to said motherboard, said cable communicating wireless signals between said wireless communication device and said motherboard.

10. The apparatus of claim 8 wherein said bay cover comprises mounting members.

11. A computer comprising:
    a memory device;
    a housing for said memory device;
    a bay cover disposed on said housing; and
    a wireless communication device mounted to said bay cover, said wireless communication device being capable of processing signals between an external device and said memory device.

12. The apparatus of claim 11 wherein said bay cover comprises mounting members.

13. An improved method for wireless communication with a computer, the method comprising:
    providing a removable bay cover of a housing case for said computer;
    affixing a wireless communication member to said removable bay cover;
    providing a cable between said wireless communication member and a computer memory device within said housing case; and
    transmitting or receiving wireless communication between an external device and said computer memory device via said wireless communication member and said cable member.

14. A method of retrofitting a conventional computer case for wireless communication, said method comprising:
    providing a wireless communication member affixed to a first bay cover;
    removing a second bay cover from said computer case, said second bay cover having a size and shape corresponding to said first bay cover;
    replacing said second bay cover with said first bay cover; and
    attaching a cable from said wireless communication member to a computer device within said computer case, said cable being capable of transmitting or receiving wireless signals between said computer device and said wireless communication member.

15. The method of claim 14 further comprising disposing said wireless communication member inside said computer case.

16. The method of claim 14 wherein replacing said second bay cover with said first bay cover comprises affixing said first bay cover to said computer case.

17. A wireless communication apparatus adapted for retro-fit installation into a standard peripheral bay of a host computer wherein the standard peripheral bay has mounting rails, said wireless communication apparatus comprising:

a U-shaped frame member having a front panel and a pair of spaced-apart mounting members extending rearwardly therefrom, said U-shaped frame member sized to fit in the standard peripheral bay of said computer with said front panel of said U-shaped frame member substantially filling a front opening of the standard peripheral bay and with said spaced-apart mounting members extending rearwardly from the front panel of said U-shaped frame member adapted for extending adjacent to and engaging the mounting rails of said standard peripheral bay;

a first aperture define in the front panel of said U-shaped frame member; and a wireless communication device connected to the front panel of said U-shaped frame member adjacent to said first aperture for wireless communication with an external peripheral.

18. The wireless communication apparatus of claim 17 further comprising a cover plate coupled to the U-shaped frame member.

* * * * *